(12) United States Patent
Hinds et al.

(10) Patent No.: US 9,230,196 B2
(45) Date of Patent: Jan. 5, 2016

(54) REUSE OF BINARY BITMAPS GENERATED FOR IMAGES IN A PRINT JOB

(75) Inventors: Arianne Therese Hinds, Louisville, CO (US); Radu Cucu, Timisoara (RO)

(73) Assignee: Ricoh Production Print Solutions LLC, Boulder, CO (US)

( * ) Notice: Subject to any disclaimer, the term of this patent is extended or adjusted under 35 U.S.C. 154(b) by 76 days.

(21) Appl. No.: 13/557,778

(22) Filed: Jul. 25, 2012

(65) Prior Publication Data

US 2013/0027750 A1 Jan. 31, 2013

Related U.S. Application Data

(60) Provisional application No. 61/511,389, filed on Jul. 25, 2011.

(51) Int. Cl.
*G06K 15/00* (2006.01)
*H04N 1/405* (2006.01)
*G06K 15/02* (2006.01)
*G06F 3/12* (2006.01)

(52) U.S. Cl.
CPC ............ *G06K 15/02* (2013.01); *G06K 15/186* (2013.01); *G06K 15/1851* (2013.01); *G06K 15/1861* (2013.01); *G06K 15/1863* (2013.01)

(58) Field of Classification Search
CPC .............. G06F 17/30312; G06F 17/30324; G06F 8/4442; G06F 12/0862; G06F 12/0866; G06F 3/1218; G06F 3/122; G06F 3/1247; G06K 15/1861; G06K 15/1863; G06K 15/02; G06K 15/186; G06K 15/1851; H04N 21/23106

USPC ........ 358/1.1, 1.9, 2.1, 3.06, 3.13–3.19, 3.22; 382/260–264, 192–194; 345/596, 589, 345/581

See application file for complete search history.

(56) References Cited

U.S. PATENT DOCUMENTS

| | | | |
|---|---|---|---|
| 5,166,809 A * | 11/1992 | Surbrook | 358/1.9 |
| 7,327,487 B2 | 2/2008 | Prosi | |
| 7,492,480 B2 | 2/2009 | Russell | |
| 7,505,172 B2 | 3/2009 | Vondran et al. | |
| 7,630,098 B2 | 12/2009 | Nagarajan et al. | |
| 2003/0231320 A1 * | 12/2003 | Tsunekawa | 358/1.2 |
| 2004/0190018 A1 | 9/2004 | Marsden et al. | |
| 2005/0044494 A1 * | 2/2005 | Barnes et al. | 715/531 |
| 2008/0100871 A1 * | 5/2008 | Iida | 358/3.13 |

(Continued)

FOREIGN PATENT DOCUMENTS

| | | |
|---|---|---|
| EP | 0478304 | 4/1992 |
| EP | 478304 A3 * | 5/1993 |

*Primary Examiner* — Chad Dickerson
(74) *Attorney, Agent, or Firm* — Duft Bornsen & Fettig LLP (57) ABSTRACT

Systems and methods of reusing binary bitmaps for images appearing multiple times in a print job. In one embodiment, a system stores a binary bitmap for an image that appears in a print job. The system determines an offset of the binary bitmap into a sheetside, and calculates position values for the binary bitmap based on the offset of the binary bitmap. The system identifies a next appearance of the image in the print job, determines an offset of the image into a sheetside for the next appearance, and calculates position values for the next appearance of the image based on the offset of the image. The system determines if the position values for the image correspond with the position values for the binary bitmap, and verifies that the binary bitmap is reusable for the next appearance of the image if the position values correspond.

15 Claims, 6 Drawing Sheets

(56) References Cited

U.S. PATENT DOCUMENTS

| | | |
|---|---|---|
| 2009/0034008 A1 | 2/2009 | Croft et al. |
| 2009/0147288 A1* | 6/2009 | Matsuda .................... 358/1.9 |
| 2010/0253699 A1* | 10/2010 | Henerlau et al. ............. 345/596 |
| 2011/0255103 A1* | 10/2011 | Matsuda .................... 358/1.9 |

* cited by examiner

REUSE OF BINARY BITMAPS GENERATED FOR IMAGES IN A PRINT JOB

RELATED APPLICATIONS

This non-provisional patent application claims priority to U.S. Provisional Patent Application No. 61/511,389 filed on Jul. 25, 2011, which is incorporated by reference as if fully included herein.

FIELD OF THE INVENTION

The invention relates to the field of printing systems, and to the reuse of binary bitmaps for images that appear multiple times in a print job.

BACKGROUND

A printer may be connected to one or more hosts that submit print jobs to the printer. When a print job is submitted, a print controller in the printer receives the print job, which may be encoded in a Page Description Language (PDL), such as PostScript (PS), Printer Command Language (PCL), XML Page Specification (XPS), etc. The print job comprises one or more logical pages that are formatted based on the PDL. The print controller then rasterizes the logical page(s) of the print job. The rasterizing process converts the logical pages of the print job into sheetside bitmaps that are printable by a print engine. The rasterizing process actually includes multiple processes, such as decompressing the print job, performing color transformations, halftoning, etc.

The process of rasterizing a print job is a time consuming process. To save processing time, the print controller may cache the bitmaps for images that appear multiple times in a print job for potential reuse at a future time. When an image appears in the same or another logical page of the print job, the bitmap may be recalled from the cache instead of having to rasterize the image again. Reuse of cached bitmaps eliminates the need to rasterize each instance of an image that appears multiple times in a print job, which saves processing time within a printer.

SUMMARY

Embodiments described herein verify that bitmaps stored for images are reusable when the images appear multiple times in a print job. One type of bitmap used for printing is a binary bitmap, where each pixel value of the binary bitmap is either ON or OFF. Reuse of binary bitmaps can be a problem because the binary bitmaps are typically generated using halftone processes that screen pixel values using threshold matrices. Each of the threshold matrices comprises an array of threshold values, where the values in the array vary. Therefore, a bitmap for an image may be screened differently based on where the image is positioned on a logical page, and a binary bitmap resulting from this screening process may not be reusable at different page positions. Thus, the embodiments described herein verify whether a binary bitmap, which is cached for an image, may be reused for subsequent appearances of the image in the print job.

One embodiment is a system comprising a storage device operable to store a binary bitmap for an image appearing in a print job. The system further comprises an image controller operable to determine an offset of the binary bitmap into a sheetside, and to calculate position values for the binary bitmap based on the offset of the binary bitmap. The image controller is further operable to identify the next appearance of the image in the print job, to determine an offset of the image into a sheetside for the next appearance, and to calculate position values for the next appearance of the image based on the offset of the image. The image controller is further operable to determine if the position values for the image correspond with the position values for the binary bitmap, and to verify that the binary bitmap in the storage device is reusable for the next appearance of the image if the position values correspond.

In another embodiment, the image controller is further operable to instruct a raster image processor to reuse the binary bitmap instead of rasterizing the next appearance of the image if the binary bitmap is verified as reusable.

In another embodiment, the image controller is further operable to instruct the raster image processor to rasterize the next appearance of the image if the binary bitmap is not verified as reusable.

In another embodiment, the binary bitmap is generated using threshold matrices, and each of the threshold matrices includes an array of threshold values.

In another embodiment, the image controller is further operable to calculate the position values for the binary bitmap based further on the size of the threshold matrices that are used to generate the binary bitmap.

In another embodiment, the image controller is further operable to calculate the position values for the binary bitmap using the following algorithm:

position value x=(x offset % width of the threshold matrices) % horizontal size of a repeating pattern of the threshold values within the threshold matrices; and position value y=(y offset % length of the threshold matrices) % vertical size of a repeating pattern of the threshold values within the threshold matrices;

where "%" indicates the integer modulus operator.

Another embodiment comprises a method of reuse a binary bitmap. The method includes storing a binary bitmap for an image appearing in a print job, determining an offset of the binary bitmap into a sheetside, and calculating position values for the binary bitmap based on the offset of the binary bitmap. The method further includes identifying a next appearance of the image in the print job, determining an offset of the image into a sheetside for the next appearance, calculating position values for the next appearance of the image based on the offset of the image, determining if the position values for the image correspond with the position values for the binary bitmap, and verifying that the binary bitmap in the storage device is reusable for the next appearance of the image if the position values correspond.

Another method comprises a non-transitory computer-readable medium that stores instructions. When executed by a processor, the instructions are configured to instruct the processor to:

store a binary bitmap for an image appearing in a print job;

determine an offset of the binary bitmap into a sheetside;

calculate position values for the binary bitmap based on the offset of the binary bitmap;

identify a next appearance of the image in the print job;

determine an offset of the image into a sheetside for the next appearance;

calculate position values for the next appearance of the image based on the offset of the image;

determine if the position values for the image correspond with the position values for the binary bitmap; and verify that the binary bitmap in the storage device is reusable for the next appearance of the image if the position values correspond.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
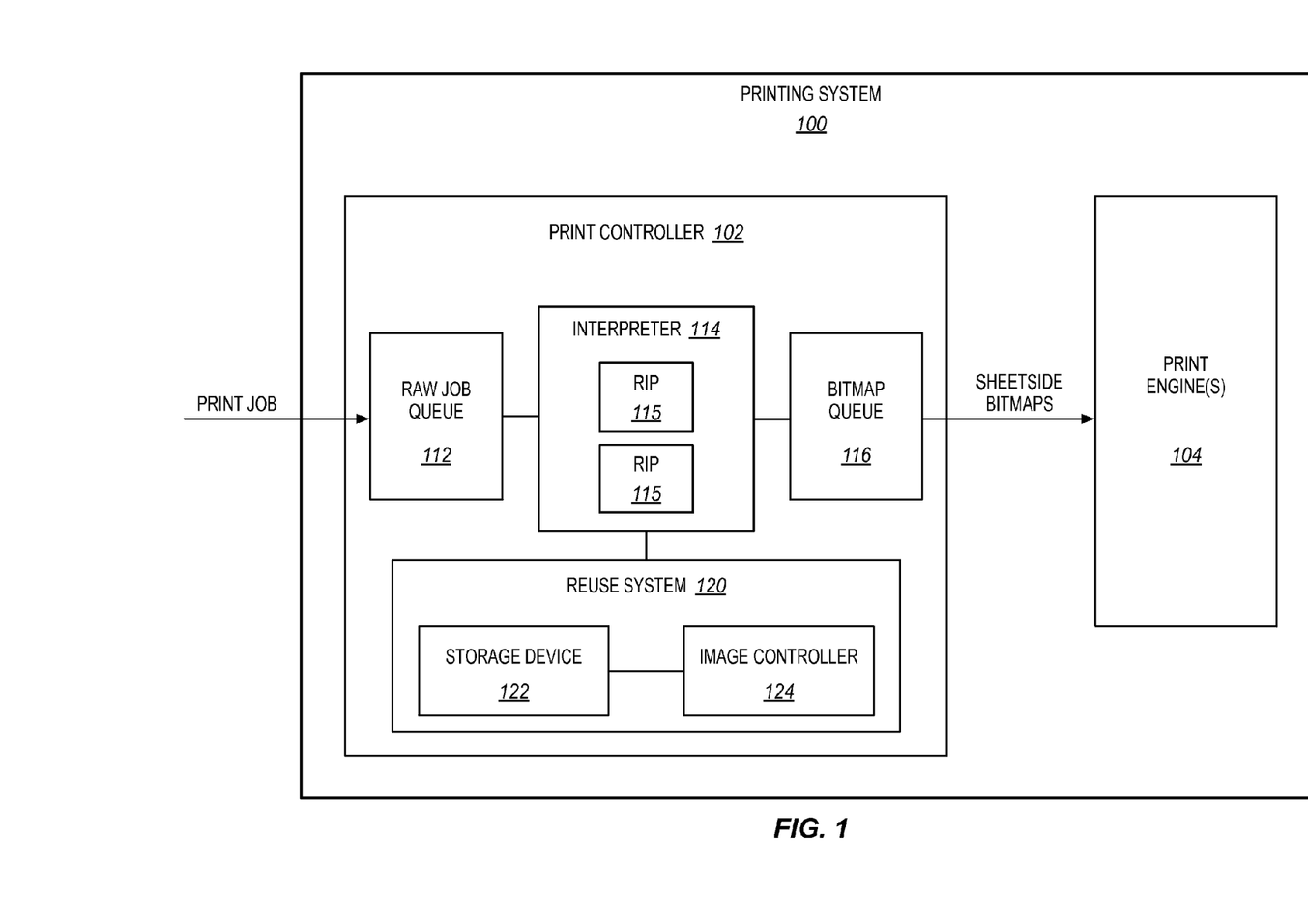
FIG. 1 illustrates a printing system in an exemplary embodiment.

FIG. 1 illustrates a printing system 100 in an exemplary embodiment. Printing system 100 comprises any system used to provide marks on a media, such as a continuous forms printer or a cut sheet printer. In this embodiment, printing system 100 includes a print controller 102 and one or more print engines 104. Print controller 102 comprises any system, server, or device configured to control the printing of print jobs on print engines 104. Print engines 104 each comprise any device or component configured to perform an imaging process to mark a printable medium, such as paper. In one embodiment, print engines 104 may comprise one or more laser print heads that use a toner to mark the medium. In another embodiment, the print engines may include a printhead controller and an array of printheads comprising multiple tiny nozzles (e.g., 360 nozzles per printhead depending on resolution). The printheads are configured to discharge ink as controlled by the printhead controller. Printing system 100 may include other components or systems not shown for the sake of brevity.

Print controller 102, in its generalized form, includes a raw job queue 112, an interpreter 114, and a bitmap queue 116. Raw job queue 112 communicates with one or more host systems (not shown) to receive and queue raw print jobs for printing. Interpreter 114 comprises any system or device adapted to rasterize raw print data from the print jobs to generate rasterized data, which is also referred to herein as bitmaps. Interpreter 114 may include one or more Raster Image Processors (RIPs) 115 that "rip" the raw print data to generate the bitmaps. Bitmap queue 116 comprises any system or device adapted to receive the bitmaps from interpreter 114 and queue the bitmaps for printing on print engines 104.

The process of rasterizing the raw print data essentially converts continuous tone images (i.e., vector graphics data) into bitmaps, where each bitmap is an array of pixels assembled into a sheetside for printing. Within a bitmap, each pixel has a value, referred to as a pixel value, and an associated location or position. For example, the upper left pixel in a bitmap may have a location (in a two-dimensional array) of [1,1], and a pixel value of 10 (assuming at least a four bit resolution). In a binary bitmap, the pixel value is a 1-bit number indicating either ON or OFF. For grayscale images, the pixel value is a number that represents the brightness of the pixel. In a byte image, the pixel value is an 8-bit integer giving a range of possible values from 0 to 255 indicating the intensity of the pixel. Typically, a value of zero is black, a value of 255 is white, and values in between make up different shades of gray. To represent color images, separate color components are specified for each pixel. For example, in an RGB colorspace, a pixel value is actually a vector of three numbers. The pixel value therefore defines a brightness for each of red, green and blue.

One process used for rasterizing raw print data is halftoning. Halftoning simulates a continuous tone image with dots that vary either in size and/or in spacing. Halftoning uses a high frequency/low frequency dichotomy to generate a continuous tone illusion from a halftone image. In halftoning, the low frequency component is a local area of the output image designated as a halftone cell. Each halftone cell relates to a corresponding area (size and location) of the continuous tone image. Within each halftone cell, the high frequency component is a variable-sized halftone dot composed of ink or toner. The ratio of the inked area to the non-inked area within the halftone cell represents the luminosity of the corresponding area on the continuous tone image. From a distance, the human eye averages both the high frequency component corresponding to the ink ratio within the halftone cell and the low frequency component corresponding to the size of the halftone cell.

In the embodiments described herein, interpreter 114 rasterizes the raw print data to generate binary bitmaps, where the pixel values are either ON or OFF. To generate binary bitmaps, interpreter 114 may perform a halftone process to convert the continuous tone image into a bitmap having pixel values greater than 1-bit. For example, the bitmap may comprise one byte pixel values. Interpreter 114 may then perform a screening process (e.g., a halftone screen) on the bitmap to reduce its resolution down to a binary bitmap.

Figure 2:
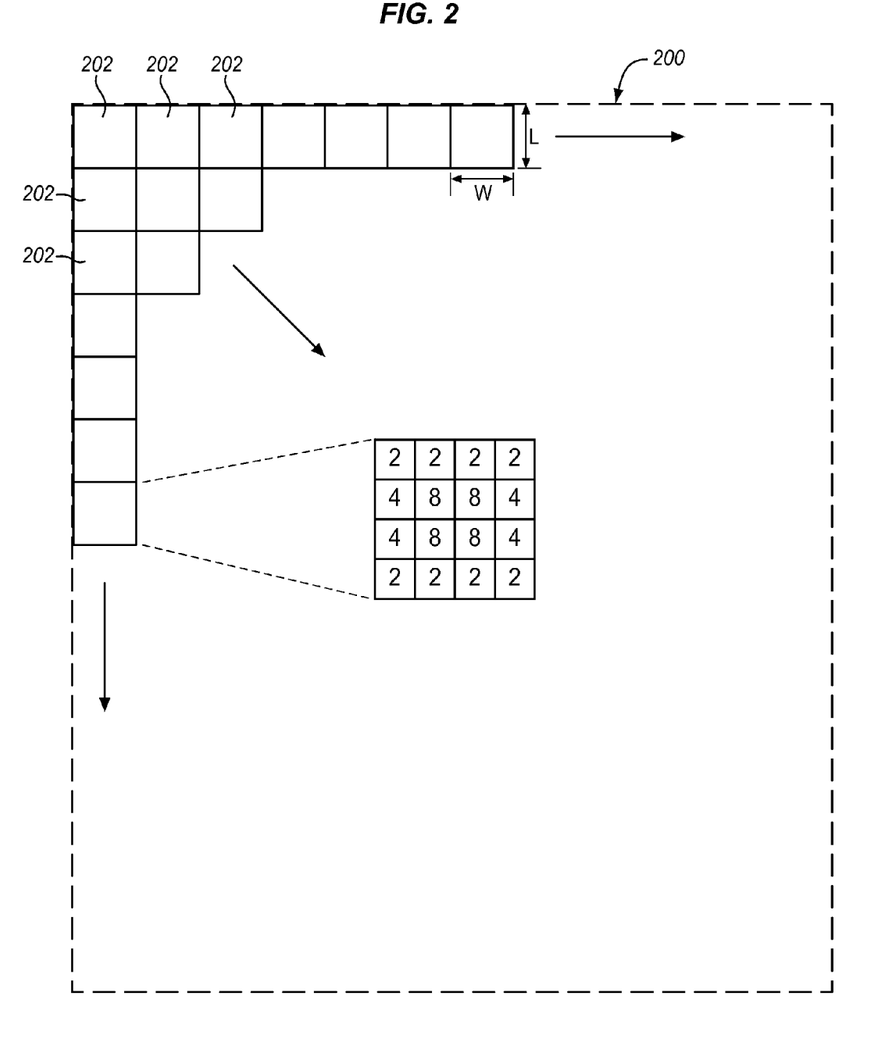
FIG. 2 illustrates a grid of threshold matrices overlaid on a bitmap in an exemplary embodiment.

A screening process uses threshold matrices to reduce the resolution of the pixel values of the bitmap down to binary values. For the screening process, the threshold matrices are overlaid upon the bitmap to form a grid. FIG. 2 illustrates a grid of threshold matrices overlaid on a bitmap in an exemplary embodiment. Bitmap 200 as shown in FIG. 2 has pixel values greater than 1 bit. The threshold matrices 202 are replicated in a horizontal direction across bitmap 200 and in a vertical direction down bitmap 200. Each threshold matrix 202 comprises an array of threshold values. FIG. 2 illustrates a threshold matrix 202 having a 4×4 array of threshold values for illustrative purposes. A typical threshold matrix may have an array of threshold values that is much larger, such as 128×128. The length (L) and width (W) of the threshold matrices may vary depending on desired implementations.

When threshold matrices 202 are overlaid on bitmap 200, each of the threshold values from the matrices 202 will correspond with a pixel value of bitmap 200. The threshold values define whether the corresponding pixel value in bitmap 200 is considered ON or OFF. For example, assume that a threshold value is set at 8. If a corresponding pixel value in bitmap 200 is less than 8, then the pixel at this location may be considered ON. If a corresponding pixel value in bitmap 200 is greater than 8, then the pixel at this location may be considered OFF. Each pixel value of bitmap 200 is compared to its corresponding threshold value to generate the binary bitmap.

The process of rasterizing raw print data and screening bitmaps can be time consuming, and can negatively impact the throughput performance of a printer. To improve the throughput of the printer, print controller 102 further includes a reuse system 120 (see FIG. 1) that is configured to reuse binary bitmaps for images that appear multiple times in a print job (or print jobs). Reuse system 120 is able to cache a binary bitmap for an image that has already been rasterized and screened for potential reuse at a future time. If the same image appears in the print job multiple times, reuse system 120 can recall the binary bitmap for this image from memory, and the image does not have to be rasterized and screened another time.

Figure 3:
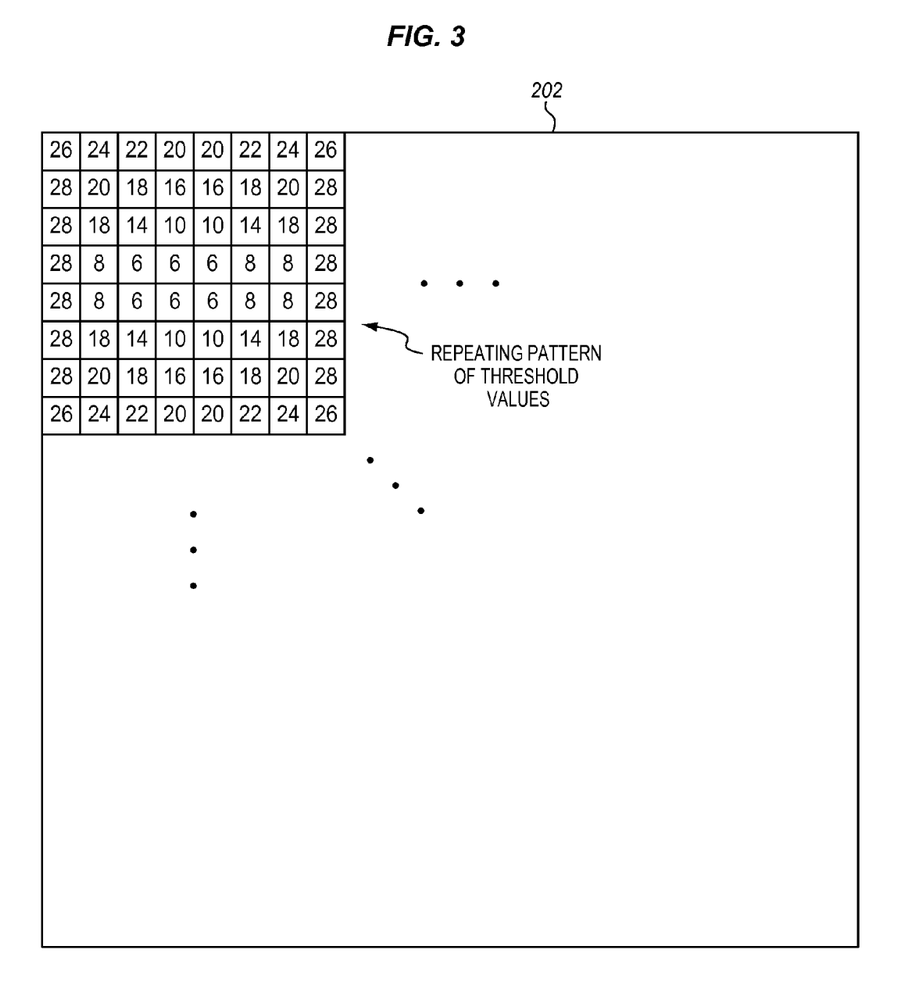
FIG. 3 illustrates a portion of a threshold matrix in an exemplary embodiment.
Figure 4:
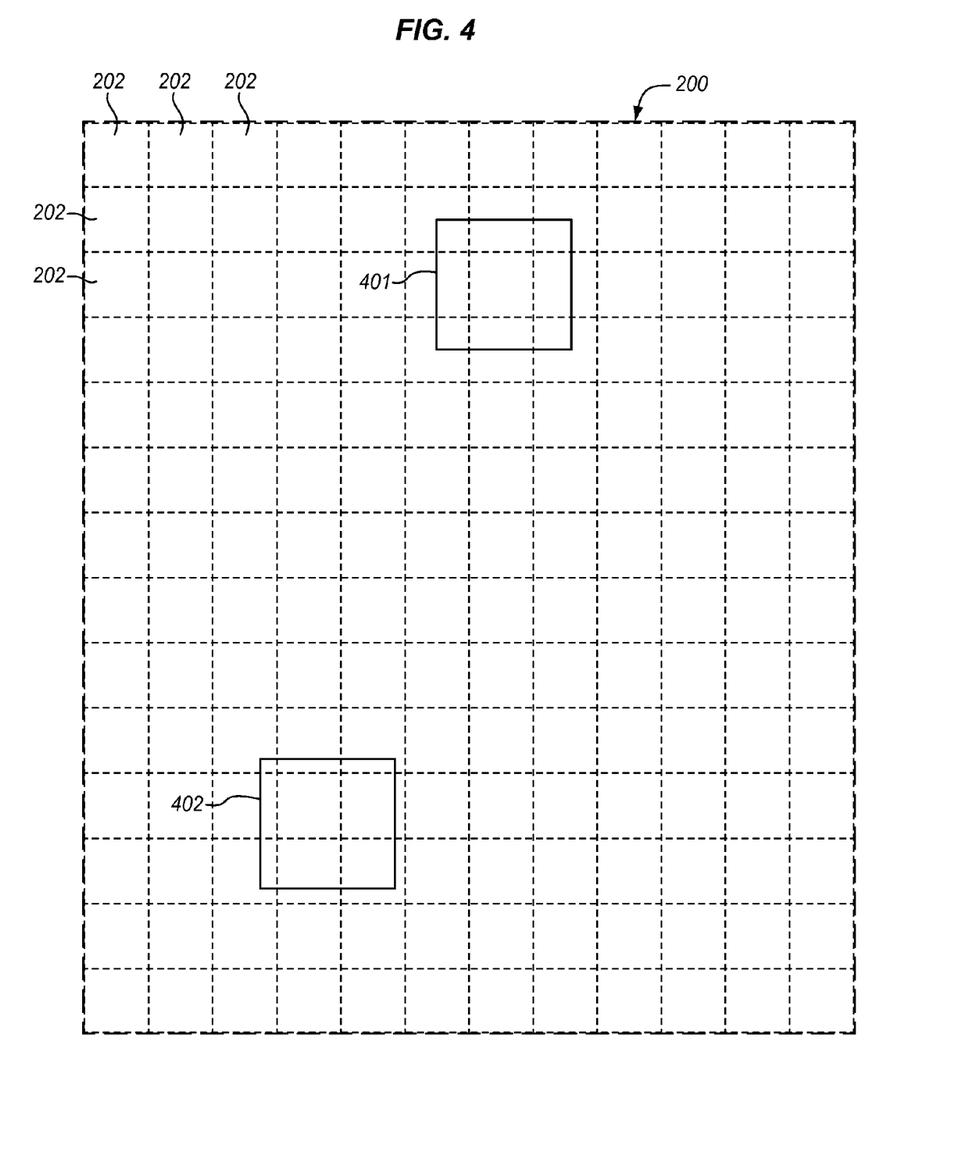
FIG. 4 illustrates an image positioned on a bitmap at different locations in an exemplary embodiment.

As described above, one problem with reusing binary bitmaps for an image is that the binary bitmaps are location-dependent. Within the threshold matrices 202, the threshold values will vary along the length and width of a matrix. FIG. 3 illustrates a portion of a threshold matrix 202 in an exemplary embodiment. In this example, assume that threshold matrix 202 is an array of threshold values that is 128×128. These values vary within the matrix as is evident in FIG. 3. Thus, an image will be screened differently depending on where it is located in relation to the threshold matrices. FIG. 4 illustrates an image positioned on a bitmap at different locations in an exemplary embodiment. In FIG. 4, reference number 200 illustrates the bitmap for a sheetside that will be printed. Reference number 401 illustrates an image in the bitmap that may appear at two different locations on the sheetside. Image 401 may be screened differently at these two locations. For example, one instance shows image 401 positioned with its upper left corner located in the middle of a threshold matrix. The other instance shows image 401 positioned with its upper left corner located toward the bottom right of a threshold matrix. Because the threshold values in the matrices vary, image 401 may be screened differently depending on where it is located on a sheetside and how the threshold matrices are overlaid upon the image 401.

Although the screening process can vary depending on the location of an image, a binary bitmap can be reused at different locations of a sheetside. The threshold matrices are repeated lengthwise and widthwise along the sheetside to create the grid as shown in FIGS. 2 and 4. Also, the matrices typically have repeating patterns or nearly repeating patterns of threshold values. In FIG. 3, an 8×8 sub-array of threshold values is shown within a threshold matrix. This 8×8 sub-array of threshold values will repeat horizontally and vertically throughout the matrix 202. For instance, if matrix 202 is 128×128, this pattern shown in FIG. 3 will repeat 16 times horizontally and 16 times vertically within matrix 202. Because there is a repeating pattern of threshold values within the matrices 202, a bitmap may be screened the same (or nearly the same) even though it positioned at different locations on a sheetside. Therefore, when a binary bitmap for an image is cached by reuse system 120, the binary bitmap may be reused at some locations, and may not be reused at other locations.

In the embodiments described herein, reuse system 120 is enhanced to be able to verify whether a binary bitmap that is cached for an image can be reused at different locations on a sheetside. Reuse system 120 includes a storage device 122 and an image controller 124. Storage device 122 comprises any cache or memory that is able to store one or more binary bitmaps. Image controller 124 comprises any component that is able to verify whether a cached binary bitmap for an image can be reused for subsequent appearances of the image in a print job so that the image does not have to be rasterized and screened again. The operation of reuse system 120 is further described in FIG. 5.

Figure 5:
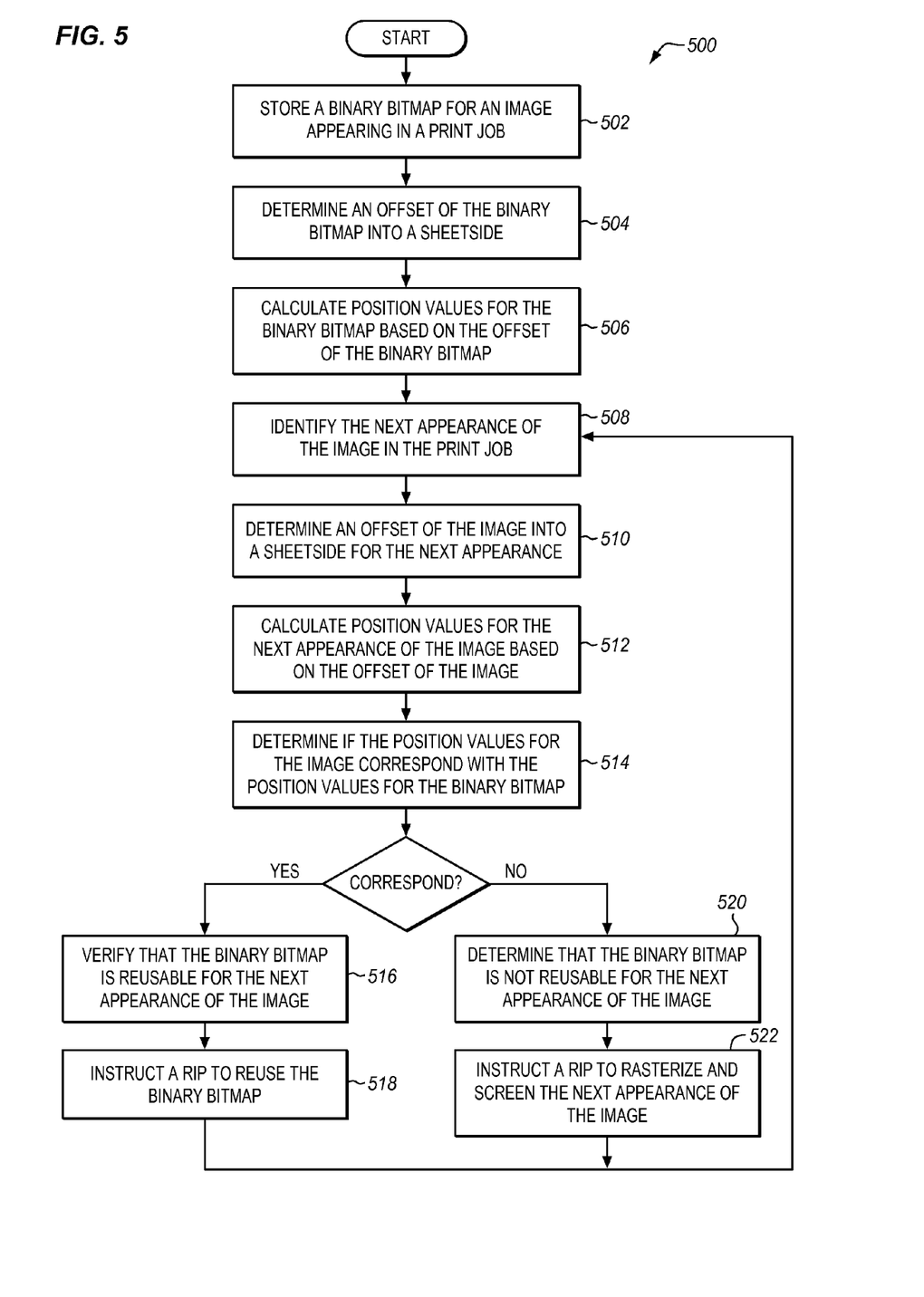
FIG. 5 is a flowchart illustrating a method of verifying whether a binary bitmap for an image can be reused in an exemplary embodiment.

FIG. 5 is a flowchart illustrating a method 500 of verifying whether a binary bitmap for an image can be reused in an exemplary embodiment. The steps of method 500 are described with reference to reuse system 120 of FIG. 1, but those skilled in the art will appreciate that method 500 may be performed in other systems or devices. The steps of the flowcharts described herein are not all inclusive and may include other steps not shown. The steps described herein may also be performed in an alternative order.

One assumption for method 500 is that interpreter 114 in FIG. 1 rasterizes and screens an image that appears in a print job to generate a binary bitmap for the image. In step 502 of method 500, storage device 122 stores the binary bitmap for the image. Another assumption is that the image appears multiple times in the print job (or other print jobs), and that the binary bitmap may be reused for subsequent appearances of the image in the print job.

In step 504, image controller 124 determines an offset of the binary bitmap into a sheetside. The offset of the binary bitmap is an x,y offset that indicates the position of the binary bitmap into a sheetside or a page. For example, the x,y offset of the binary bitmap may be [257,270]. In step 506, image controller 124 calculates position values for the binary bitmap based on the offset of the binary bitmap. Because the binary bitmap may be reused at different page positions, the position values calculated by image controller 124 indicate where the binary bitmap can be reused.

In addition to the offset of the binary bitmap, there may be other parameters that are considered in calculating the position values for the binary bitmap. For example, the size of the threshold matrices that are used to screen the bitmap for the image may be considered. Another parameter that may be considered is the size of the repeating pattern of threshold values in the threshold matrices. The dimensions of the threshold matrices and the size of the repeating patterns (or nearly repeating patterns) are stored in a table that is accessible to image controller 124.

In one embodiment, image controller 124 may compute the position values for the binary bitmap using the following algorithm:

position value x=(x offset % width of threshold matrix) % horizontal size of a repeating pattern of threshold values within the threshold matrix; and position value y=(y offset % length of threshold matrix) % vertical size of a repeating pattern of threshold values within the threshold matrix;

where % indicates the integer modulus operator.

Assume for example that the binary bitmap is located at position [257,270] into a sheetside. Further assume that the threshold matrices are 128×128 and there is a repeating pattern of threshold values in 8×8 sub-arrays. Using the above algorithm, image controller 124 calculates a position value x of: (257 MOD 128) MOD 8=1. Image controller 124 also calculates a position value y of: (270 MOD 128) MOD 8=6. Therefore, the position values for the binary bitmap is [1,6].

After calculating the position values for the binary bitmap, image controller 124 may store the position values in storage device 122 along with the binary bitmap.

As interpreter 114 is rasterizing the print job, assume that interpreter 114 encounters the next appearance of the image in the print job. Instead of rasterizing and screening the image again, interpreter 114 may be able to reuse the binary bitmap of the image that is stored in reuse system 120. Therefore, interpreter 114 may communicate with reuse system 120 to determine whether a cached binary bitmap of the image can be reused for the next appearance of the image. For example, interpreter 114 may transmit a request for instructions to reuse system 120. The request may include an offset for the next appearance of the image.

In step 508, image controller 124 identifies the next appearance of the image in the print job, such as in response to the communication from interpreter 114. In step 510, image controller 124 determines an offset of the image into a sheetside for the next appearance. Image controller 124 may determine the offset for the image based on information provided by interpreter 114, or may determine the offset in any other desired manner. In step 512, image controller 124 calculates position values for the next appearance of the image based on the offset of the image. Image controller 124 may use the same algorithm as described above to calculate the position values for the next appearance of the image.

In step 514, image controller 124 determines if the position values for the image correspond with the position values for the binary bitmap. If the position values correspond, then image controller 124 verifies that the binary bitmap is reusable for the next appearance of the image in the print job in step 516. Image controller 124 may then instruct interpreter 114 (or one of the RIPs) to reuse the binary bitmap in step 518 instead of rasterizing the next appearance of the image. Image controller 124 may also send a copy of the binary bitmap to interpreter 114.

If the position values do not correspond, then image controller 124 determines that the binary bitmap is not reusable for the next appearance of the image in the print job in step 520. Image controller 124 may then instruct interpreter 114 to rasterize and screen the next appearance of the image in a normal fashion in step 522.

For example, assume that the next appearance of the image in the print job is at position [385,262] into a sheetside. Using the above algorithm, image controller 124 calculates the following position value x for the image: (358 MOD 128) MOD 8=1. Image controller 124 also calculates the following position value y for the image: (262 MOD 128) MOD 8=6. Therefore, the position values for the next appearance of the image is [1,6]. Because the position values for the next appearance of the image match the position values for the binary bitmap, image controller 124 determines that the binary bitmap may be reused even though the image is located at a different position into a sheetside.

Reuse system 120 is advantageously able to determine whether binary bitmaps of images are able to be reused at different positions on a sheetside. When a binary bitmap can be reused at certain page positions, interpreter 114 does not have to rasterize and screen the image another time, which saves processing time. At the same time, reuse system 120 avoids reusing binary bitmaps at other page positions that could cause errors.

Figure 6:
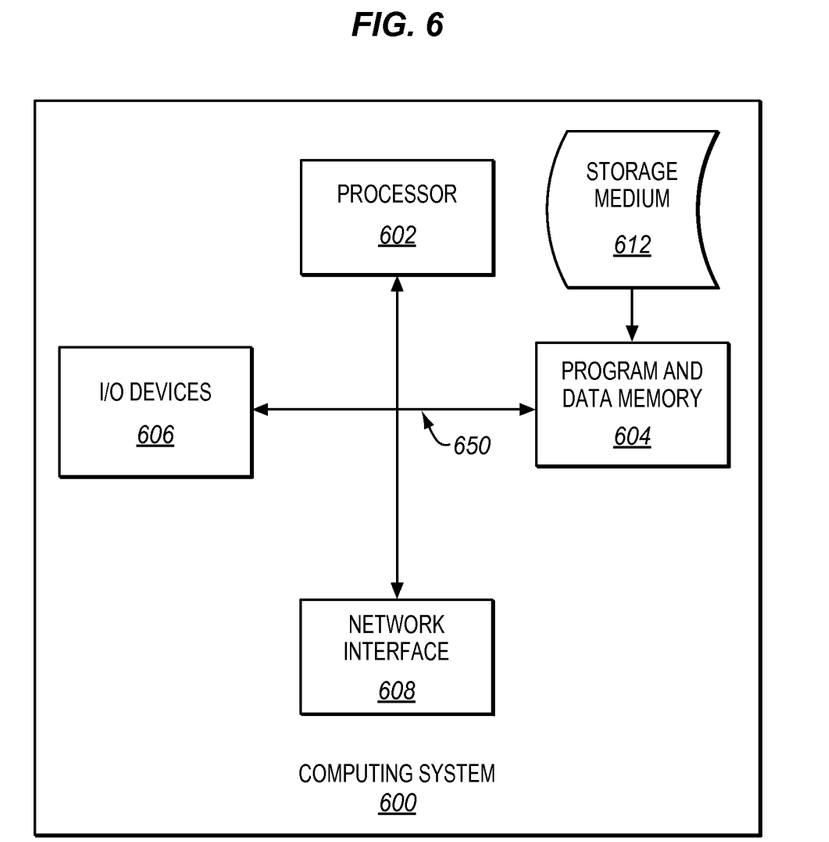
FIG. 6 illustrates a computing system in an exemplary embodiment.

The invention can take the form of an entirely hardware embodiment, an entirely software embodiment, or an embodiment comprising both hardware and software elements. In one embodiment, the invention is implemented in software, which includes but is not limited to firmware, resident software, microcode, etc. FIG. 6 illustrates a computing system in an exemplary embodiment.

Furthermore, the invention can take the form of a computer program product accessible from a computer-usable or computer-readable medium 612 providing program code for use by or in connection with a computer or any instruction execution system. For the purposes of this description, a computer-usable or computer readable medium 612 can be any apparatus that can contain, store, communicate, or transport the program for use by or in connection with the instruction execution system, apparatus, or device.

The medium 612 can be an electronic, magnetic, optical, electromagnetic, infrared, or semiconductor system (or apparatus or device) or a propagation medium. Examples of a computer-readable medium 612 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include one or more processors 602 coupled directly or indirectly to memory 604 through a system bus 650. The memory 604 can include local memory employed during actual execution of the program code, bulk storage, and cache memories which provide temporary storage of at least some program code in order to reduce the number of times code is retrieved from bulk storage during execution.

Input/output or I/O devices 606 (including but not limited to keyboards, displays, pointing devices, etc.) can be coupled to the system either directly or through intervening I/O controllers.

Network adapters may also be coupled to the system to enable the data processing system to become coupled to other data processing systems, such a through network interfaces 608, or remote printers or storage devices through intervening private or public networks. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A system to reuse a binary bitmap generated for a continuous tone image appearing multiple times in a print job, the system comprising:
    a storage device that stores the binary bitmap for a first appearance of the continuous tone image, wherein the first appearance of the continuous tone image was previously rasterized by an interpreter to generate a non-binary bitmap, and the non-binary bitmap was screened by the interpreter using threshold matrices that are overlaid on the non-binary bitmap to reduce a resolution of pixel values in the non-binary bitmap down to binary values to generate the binary bitmap;
    wherein the threshold matrices include a repeating pattern of threshold values that make the binary bitmap position-dependent; and
    an image controller that determines an offset of the binary bitmap into a sheetside, and calculates position values for the binary bitmap based on the offset of the binary bitmap and parameters of the threshold matrices to indicate where the binary bitmap is reusable;

the image controller receives a communication from the interpreter regarding a next appearance of the continuous tone image in the print job at a different position into the sheetside while the interpreter is rasterizing the print job;

the image controller determines an offset of the next appearance of the continuous tone image into the sheetside, calculates position values for the next appearance of the continuous tone image based on the offset of the next appearance of the continuous tone image and the parameters of the threshold matrices, determines if the position values for the next appearance of the continuous tone image correspond with the position values for the binary bitmap stored in the storage device, and verifies that the binary bitmap is reusable for the next appearance of the continuous tone image if the position values correspond;

the image controller instructs the interpreter to reuse the binary bitmap at the different position into the sheetside instead of rasterizing the next appearance of the continuous tone image if the binary bitmap is verified as reusable.

2. The system of claim 1 wherein: the image controller instructs the interpreter to rasterize the next appearance of the continuous tone image if the binary bitmap is not verified as reusable.

3. The system of claim 1 wherein: the image controller calculates the position values for the binary bitmap based on a size of the repeating pattern of threshold values in the threshold matrices.

4. The system of claim 1 wherein: the image controller calculates the position values for the binary bitmap based on a size of the threshold matrices.

5. The system of claim 1 wherein:
the image controller calculates the position values for the binary bitmap using the following algorithm:
position value x=(x offset % width of the threshold matrices) % horizontal size of the repeating pattern of threshold values within the threshold matrices; and
position value y=(y offset % length of the threshold matrices) % vertical size of the repeating pattern of threshold values within the threshold matrices;
where "%" indicates an integer modulus operator.

6. A method for reusing a binary bitmap generated for a continuous tone image appearing multiple times in a print job, the method comprising:
storing the binary bitmap for a first appearance of the continuous tone image, wherein the first appearance of the continuous tone image was previously rasterized by an interpreter to generate a non-binary bitmap, and the non-binary bitmap was screened by the interpreter using threshold matrices that are overlaid on the non-binary bitmap to reduce a resolution of pixel values in the non-binary bitmap down to binary values to generate the binary bitmap;
wherein the threshold matrices include a repeating pattern of threshold values that make the binary bitmap position-dependent;
determining an offset of the binary bitmap into a sheetside;
calculating position values for the binary bitmap based on the offset of the binary bitmap and parameters of the threshold matrices to indicate where the binary bitmap is reusable;
receiving a communication from the interpreter regarding a next appearance of the continuous tone image in the print job at a different position into the sheetside while the interpreter is rasterizing the print job;
determining an offset of the next appearance of the continuous tone image into the sheetside;
calculating position values for the next appearance of the continuous tone image based on the offset of the next appearance of the continuous tone image and parameters of the threshold matrices;
determining if the position values for the next appearance of the continuous tone image correspond with the position values for the binary bitmap stored in the storage device;
verifying that the binary bitmap is reusable for the next appearance of the continuous tone image if the position values correspond; and
instructing the interpreter to reuse the binary bitmap at the different position into the sheetside instead of rasterizing the next appearance of the continuous tone image if the binary bitmap is verified as reusable.

7. The method of claim 6 further comprising: instructing the interpreter to rasterize the next appearance of the continuous tone image if the binary bitmap is not verified as reusable.

8. The method of claim 6 wherein calculating the position values comprises:
calculating the position values for the binary bitmap based on a size of the repeating pattern of threshold values in the threshold matrices.

9. The method of claim 6 wherein calculating the position values comprises:
calculating the position values for the binary bitmap based on a size of the threshold matrices.

10. The method of claim 6 wherein calculating the position values comprises:
calculating the position values for the binary bitmap using the following algorithm:
position value x=(x offset % width of the threshold matrices) % horizontal size of the repeating pattern of threshold values within the threshold matrices; and
position value y=(y offset % length of the threshold matrices) % vertical size of the repeating pattern of threshold values within the threshold matrices;
where "%" indicates an integer modulus operator.

11. A non-transitory computer-readable medium that stores instructions that, when executed by a processor, instruct the processor to:
store a binary bitmap for a first appearance of a continuous tone image in a print job, wherein the first appearance of the continuous tone image was previously rasterized by an interpreter to generate a non-binary bitmap, and the non-binary bitmap was screened by the interpreter using threshold matrices that are overlaid on the non-binary bitmap to reduce a resolution of pixel values in the non-binary bitmap down to binary values to generate the binary bitmap;
wherein the threshold matrices include a repeating pattern of threshold values that make the binary bitmap position-dependent;
determine an offset of the binary bitmap into a sheetside;
calculate position values for the binary bitmap based on the offset of the binary bitmap and parameters of the threshold matrices to indicate where the binary bitmap is reusable;
receive a communication from the interpreter regarding a next appearance of the continuous tone image in the print job at a different position into the sheetside while the interpreter is rasterizing the print job;
determine an offset of the next appearance of the continuous tone image into the sheetside;

calculate position values for the next appearance of the continuous tone image based on the offset of the next appearance of the continuous tone image and the parameters of the threshold matrices;

determine if the position values for the next appearance of the continuous tone image correspond with the position values for the binary bitmap;

verify that the binary bitmap is reusable for the next appearance of the continuous tone image if the position values correspond; and instruct the interpreter to reuse the binary bitmap at the different position into the sheetside instead of rasterizing the next appearance of the continuous tone image if the binary bitmap is verified as reusable.

12. The computer-readable medium of claim 11 wherein the instructions, when executed by a processor, instruct the processor to: instruct the interpreter to rasterize the next appearance of the continuous tone image if the binary bitmap is not verified as reusable.

13. The computer-readable medium of claim 11 wherein the instructions, when executed by a processor, instruct the processor to:

calculate the position values for the binary bitmap based on a size of the repeating pattern of threshold values in the threshold matrices.

14. The computer-readable medium of claim 11 wherein the instructions, when executed by a processor, instruct the processor to: calculate the position values for the binary bitmap based on a size of the threshold matrices.

15. The computer-readable medium of claim 11 wherein the instructions, when executed by a processor, instruct the processor to:

calculate the position values for the binary bitmap using the following algorithm:

position value x=(x offset % width of the threshold matrices) % horizontal size of the repeating pattern of threshold values within the threshold matrices; and position value y=(y offset % length of the threshold matrices) % vertical size of the repeating pattern of threshold values within the threshold matrices;

where "%" indicates an integer modulus operator.

* * * * *